US008174231B2

(12) United States Patent
Sandberg et al.

(10) Patent No.: US 8,174,231 B2
(45) Date of Patent: May 8, 2012

(54) MECHANICAL METHODS FOR CHARGING A CAR BATTERY, RELATED SYSTEMS AND INFRASTRUCTURE

(75) Inventors: Chet Sandberg, Palo Alto, CA (US); Alan J. Gotcher, Incline Village, NV (US); C. Robert Pedraza, Newtown, PA (US)

(73) Assignee: Altairmano, Inc., Reno, NV (US)

( * ) Notice: Subject to any disclaimer, the term of this patent is extended or adjusted under 35 U.S.C. 154(b) by 875 days.

(21) Appl. No.: 12/132,591

(22) Filed: Jun. 3, 2008

(65) Prior Publication Data

US 2008/0297109 A1    Dec. 4, 2008

Related U.S. Application Data

(60) Provisional application No. 60/932,945, filed on Jun. 4, 2007.

(51) Int. Cl.
*H02J 7/00* (2006.01)
(52) U.S. Cl. ............ 320/104; 320/101; 290/45; 290/1 R
(58) Field of Classification Search .................. 320/101, 320/104, 105; 290/45, 1 R
See application file for complete search history.

(56) References Cited

U.S. PATENT DOCUMENTS

| | | | |
|---|---|---|---|
| 6,457,351 B1 * | 10/2002 | Yamamoto | 73/116.05 |
| 2003/0042866 A1 * | 3/2003 | Minamiura et al. | 320/104 |
| 2005/0242589 A1 * | 11/2005 | Zinck | 290/43 |

* cited by examiner

*Primary Examiner* — Samuel Berhanu
(74) *Attorney, Agent, or Firm* — Yudell Isidore Ng Russell PLLC

(57) ABSTRACT

The methods, system, and infrastructure described herein generally relate to methods for charging a rechargeable battery of a vehicle. The methods described provide a method of charging a rechargeable battery of a vehicle. The method includes the following steps: (a) while the vehicle is stationary, rotating a shaft of an electric traction motor of the vehicle using mechanical energy; (b) converting the rotation of the shaft into electrical energy by using the electric traction motor as an electrical generator; and (c) storing the electrical energy in the rechargeable battery of the vehicle. A system for charging a rechargeable battery of a vehicle is also described. The system includes a rechargeable battery of a vehicle, an electric traction motor of the vehicle, and an external vehicle interface configured to rotate the shaft of the electric traction motor using mechanical power while the vehicle is stationary. An infrastructure for charging a rechargeable battery of a vehicle is also described. The infrastructure includes one or more charging stations, each station including an external vehicle interface configured to rotate a shaft of an electric traction motor of the vehicle using mechanical power while the vehicle is stationary.

17 Claims, 2 Drawing Sheets

Example of an elongate roller system with another vehicle driving it which may be used to mechanically recharge a rechargeable battery of a vehicle.

Figure 1 : Example of a roller system similar to a dynamometer driven by electric motors which may be used to mechanically recharge a rechargeable battery of a vehicle.

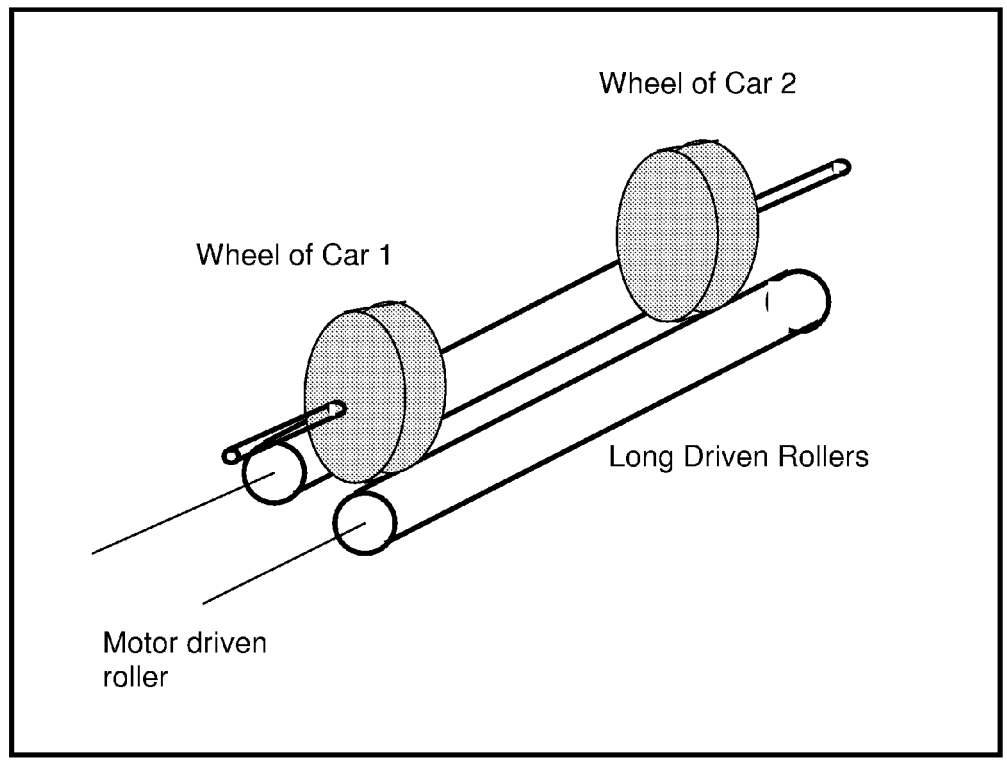
Figure 2. Example of an elongate roller system with another vehicle driving it which may be used to mechanically recharge a rechargeable battery of a vehicle.

ered vehicle. It more specifically relates to charging the rechargeable battery of the vehicle by rotating a shaft of an electric traction motor of the vehicle using mechanical power while the vehicle is stationary.

MECHANICAL METHODS FOR CHARGING A CAR BATTERY, RELATED SYSTEMS AND INFRASTRUCTURE

CROSS REFERENCE TO RELATED APPLICATION

This application claims priority to U.S. Provisional Patent Application Ser. No. 60/932,945 filed on Jun. 4, 2007, which is incorporated herein by reference in its entirety for all purposes.

BACKGROUND

1. Field

The methods, system, and infrastructure described herein generally relate to charging a rechargeable battery of a vehicle, which may be a hybrid, plug-in hybrid, or electric vehicle. It more specifically relates to charging the rechargeable battery of the vehicle by rotating a shaft of an electric traction motor of the vehicle using mechanical power while the vehicle is stationary.

2. Related Art

There are many literature reports regarding battery charging methods. U.S. Pat. No. 6,310,464, for example, discusses an apparatus for charging a battery for an electric car. The apparatus includes a battery charge controller, a battery charger, and a battery. Upon detecting an under-charge condition, the apparatus initializes a charging process where the battery is charged an expected amount, which is dependent on the degree of under-charge detected by the controller. The charger converts the externally supplied AC electric power from an electrical grid into DC electric power and outputs an electrical signal to charge the battery. The charge controller terminates the charging process after it detects that a theoretical charge has been reached.

There is a need for a new battery charging method for a rechargeable battery of a vehicle. The vehicle may be a hybrid, plug-in hybrid, or electric vehicle.

SUMMARY

The methods, system, and infrastructure described herein generally relate to charging a rechargeable battery of a vehicle, which may be a hybrid, plug-in hybrid, or electric vehicle. It more specifically relates to charging the rechargeable battery of the vehicle by rotating a shaft of an electric traction motor of the vehicle using mechanical power while the vehicle is stationary.

The methods described herein provide a method of charging a rechargeable battery of a vehicle. The vehicle may be a hybrid, plug-in hybrid, or electric vehicle. The method includes the following steps: (a) while the vehicle is stationary, rotating a shaft of an electric traction motor of the vehicle using mechanical power; (b) converting the rotation of the shaft into electrical energy by using the electric traction motor as an electrical generator; and (c) storing the electrical energy in the rechargeable battery of the vehicle.

A system for charging a rechargeable battery of a vehicle is also described. The system includes: (a) a rechargeable battery of the vehicle; (b) an electric traction motor of the vehicle; and (c) an external vehicle interface configured to rotate a shaft of the electric traction motor using mechanical power while the vehicle is stationary. The electric traction motor converts the rotation of the shaft into electrical power to charge the rechargeable battery.

Additionally, an infrastructure for charging a rechargeable battery of a vehicle is described. The infrastructure includes one or more charging stations. Each charging station comprises an external vehicle interface configured to rotate a shaft of the electric traction motor of the vehicle using mechanical power while the vehicle is stationary. The electric traction motor converts the rotation of the shaft into electrical power to charge the rechargeable battery.

BRIEF DESCRIPTION OF THE DRAWINGS

FIG. 1 shows a roller system similar to a dynamometer driven by electric motors which may be used to mechanically recharge a rechargeable battery of a vehicle.

FIG. 2 shows an elongate roller system with another vehicle driving it which may be used to mechanically recharge a rechargeable battery of a vehicle.

DETAILED DESCRIPTION

In order to provide a more thorough understanding of the methods, system, and infrastructure described herein, the following description sets forth numerous specific details, such as methods, parameters, examples, and the like. It should be recognized, however, that such description is not intended as a limitation on the scope of the methods, system, and infrastructure described herein, but rather is intended to provide a better understanding of the possible variations.

The methods, system, and infrastructure described herein generally relate to charging a rechargeable battery of a vehicle, which may be a hybrid, plug-in hybrid, or electric vehicle. It more specifically relates to charging batteries using a method that does not involve the conversion of externally supplied alternating current electric power into direct current electric power followed by the output of an electrical signal to charge a battery.

The methods, system, and infrastructure described herein typically involve the use of a vehicle's (e.g., car's, locomotive's, etc.) electric traction motor as an electric generator to produce electric power. An electric traction motor is used to power hybrid, plug-in hybrid, and electric vehicles. The electric traction motor can recharge the vehicle's batteries (e.g., lithium titanate battery) using the principle of regenerative braking when the vehicle is decelerated in driving. Typically, the vehicle's electric traction motor operates as a generator during such braking and its electrical output is connected to an electrical storage device such as a battery or capacitors.

In some variations, a vehicle's electric traction motor is used to recharge its batteries when the vehicle is stationary (i.e., parts of the vehicle may be moving but the vehicle itself is stationary) although a driver or passengers may be present. Mechanical power is used to turn the shaft of the vehicle's electric traction motor. The mechanical power is converted into electrical power by the electric traction motor, which is used to recharge the vehicle's battery.

In some variations, an external vehicle interface is used for transmitting mechanical power to the electric traction motor. The external vehicle interface is configured to rotate the shaft of the electric traction motor using mechanical power while the vehicle is stationary. The electric traction motor converts the rotation of the shaft into electrical power to charge the rechargeable battery of the vehicle. Non-limiting examples of such interfaces include the following: a roller system similar to a dynamometer driven by electric motors (FIG. 1); an elongate roller system with another vehicle driving the system (FIG. 2); and a direct mechanical connection or linkage to the shaft of the electric traction motor. The mechanical linkage may be capable of being turned by a separate motor.

In some variations, a vehicle electrical bus and control system may be provided to switch and manage the electric traction motor in a generator mode. The control system may include, without limitation, the following: an internal electronic control system that monitors charging status and compensates for ambient temperature; safety sensors to monitor generator and battery temperature; and a bus system to provide high amperage supply to the battery system. In some variations, a control system that monitors battery charging status or safety sensors to monitor generator and/or battery temperature may not be needed.

In some variations, the battery is charged at a rate that is determined by the battery's ability to accept charge. The mechanical power used to rotate the shaft of the electric traction motor is selected to achieve the proper rate depending on the type of battery.

The infrastructure described herein provides one or more stations for charging a vehicle's batteries without the need to convert externally supplied alternating current electric power into direct current electric power to charge the battery. Each charging station includes an external vehicle interface, such as the interfaces described above, configured to rotate the shaft of the electric traction motor of the vehicle using mechanical power while the vehicle is stationary. The electric traction motor converts rotation of the shaft into electrical power to charge the battery. The infrastructure may include two or more charging stations where the charging stations are between 1 and 500 miles apart. In some variations, the two or more charging stations are between 5 and 500 miles apart. In some variations, the charging stations are between 10 and 500 miles apart.

Although the methods, system, and infrastructure described herein have been described in connection with some embodiments, it is not intended to be limited to the specific form set forth herein. Rather, the scope of the methods, system, and infrastructure described herein is limited only by the claims. Additionally, although a feature may appear to be described in connection with particular variations or embodiments, one skilled in the art would recognize that various features of the described variations or embodiments may be combined in accordance with the methods, system, and infrastructure described herein.

Furthermore, although individually listed, a plurality of means, elements or method steps may be implemented by, for example, a single apparatus or method. Additionally, although individual features may be included in different claims, these may be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Terms and phrases used in this document, and variations thereof, unless otherwise expressly stated, should be construed as open ended as opposed to limiting. As examples of the foregoing: the term "including" should be read to mean "including, without limitation" or the like; the term "example" or "some variations" are used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the methods, system, and infrastructure described herein may be described or claimed in the singular, the plural is contemplated to be within the scope thereof unless limitation to the singular is explicitly stated. The presence of broadening words and phrases such as "one or more," "at least," "but not limited to," "in some variations" or other like phrases in some instances shall not be read to mean that the narrower case is intended or required in instances where such broadening phrases may be absent.

The invention claimed is:

1. A method of charging a rechargeable battery of a vehicle, the method comprising:
    (a) while the vehicle is stationary, rotating a shaft of an electric traction motor of the vehicle using mechanical power;
    (b) converting the rotation of the shaft into electrical energy by using the electric traction motor as an electrical generator; and
    (c) storing the electrical energy in the rechargeable battery of the vehicle; wherein the mechanical power is provided by an external vehicle interface; wherein the external vehicle interface comprises a roller system which turns one or more wheels of the vehicle; and wherein the roller system is driven by one or more wheels of another vehicle.

2. The method of claim 1, wherein one side of the vehicle is elevated as the external vehicle interface turns one or more wheels of the vehicle.

3. The method of claim 1, wherein the external vehicle interface comprises a mechanical linkage connected to the shaft of the electric traction motor, the mechanical linkage capable of being turned by a separate motor.

4. The method of claim 1, wherein the external vehicle interface is powered by an external source selected from the group consisting of turbine-compressed air unit, flywheel, electric grid, and battery.

5. The method of claim 1, wherein the electric traction motor is switched and managed in a generator mode with a vehicle electrical bus and control system.

6. The method of claim 5, wherein the vehicle electrical bus and control system comprises:
    an internal electronic control system that monitors charging status and compensates for ambient temperature;
    safety sensors to monitor generator and battery temperature; and
    a bus system to provide high amperage supply to the battery.

7. The method of claim 1, wherein the battery is charged at a rate, the rate determined by the battery's ability to accept charge, and wherein the mechanical power is selected to achieve the rate.

8. A system for charging a rechargeable battery of a vehicle comprising:
    (a) a rechargeable battery of the vehicle;
    (b) an electric traction motor of the vehicle; and
    (c) an external vehicle interface configured to rotate a shaft of the electric traction motor using mechanical power while the vehicle is stationary, wherein the electric traction motor converts the rotation of the shaft into electrical power to charge the rechargeable battery, wherein the external vehicle interface comprises a roller system that turns one or more of the wheels of the vehicle, and wherein the roller system is driven by one or more wheels of another vehicle.

9. The system of claim 8, wherein one side of the vehicle is elevated as the external vehicle interface turns one or more wheels of the vehicle.

10. The system of claim 8, wherein the external vehicle interface comprises a mechanical linkage to a shaft of the electric traction motor, the mechanical linkage capable of being turned by a separate motor.

11. The system of claim 8, further comprising a power source for the external vehicle interface selected from the group consisting of turbine-compressed air unit, flywheel, electric grid, and battery.

12. The system of claim 8, wherein the electric traction motor is switched and managed in a generator mode with a vehicle electrical bus and control system.

13. The system of claim 12, wherein the vehicle electrical bus and control system comprises:
   an internal electronic control system that monitor charging status and compensates for ambient temperature;
   safety sensors to monitor generator and battery temperature; and
   a bus system to provide high amperage supply to the battery.

14. An infrastructure for charging a rechargeable battery of a vehicle comprising:
   one or more charging stations, wherein each charging station comprises:
      an external vehicle interface configured to rotate a shaft of an electric traction motor of the vehicle using mechanical power while the vehicle is stationary, wherein the electric traction motor converts the rotation of the shaft into electrical power to charge the rechargeable battery, wherein the external vehicle interface comprises a roller system that turns one or more of the wheels of the vehicle, and wherein the roller system is driven by one or more wheels of another vehicle.

15. The infrastructure of claim 14 comprising two or more charging stations, wherein the charging stations are between 1 and 500 miles apart.

16. The infrastructure of claim 15 comprising two or more charging stations, wherein the charging stations are between 5 and 500 miles apart.

17. The infrastructure of claim 16 comprising two or more charging stations, wherein the charging stations are between 10 and 500 miles apart.

* * * * *